No. 717,430. Patented Dec. 30, 1902.
H. K. MILNER & J. McM. LANSDEN, Jr.
TRANSMISSION FRAME FOR AUTOMOBILES.
(Application filed Aug. 2, 1901.)
(No Model.) 3 Sheets—Sheet 2.
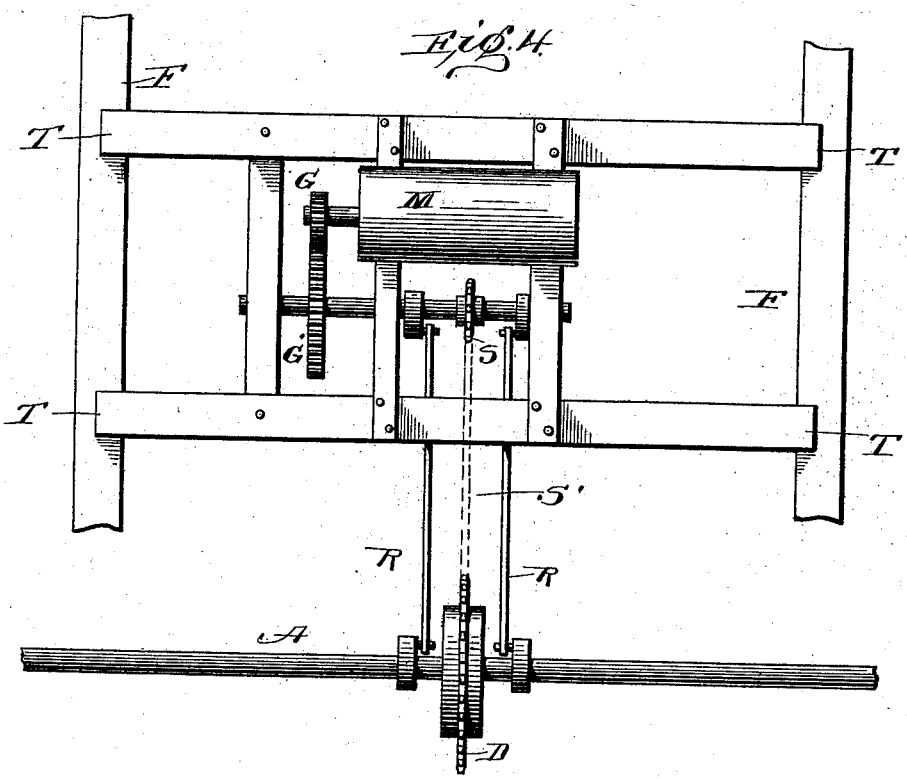

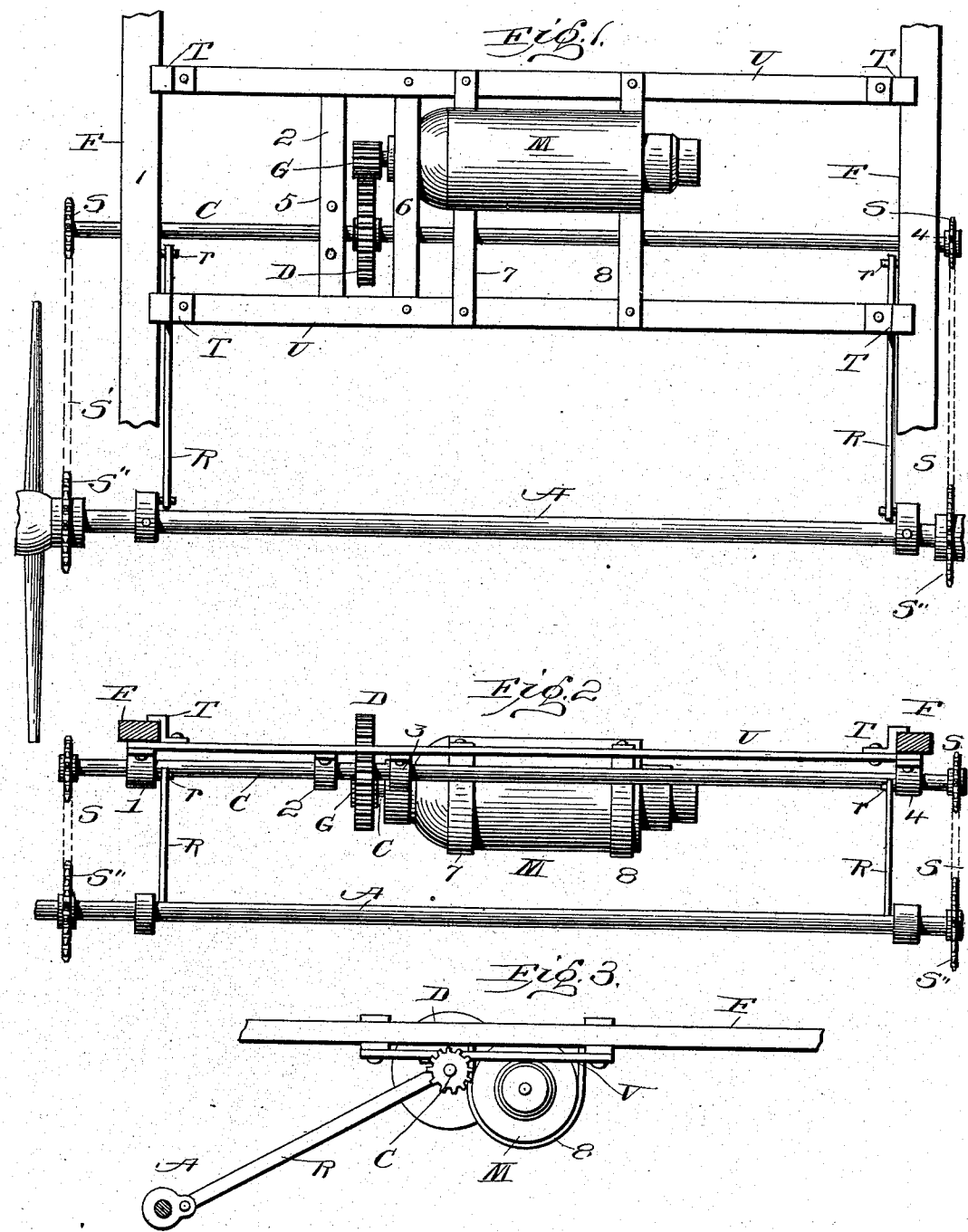

No. 717,430. Patented Dec. 30, 1902.
H. K. MILNER & J. McM. LANSDEN, Jr.
TRANSMISSION FRAME FOR AUTOMOBILES.
(Application filed Aug. 2, 1901.)
(No Model.) 3 Sheets—Sheet 3.
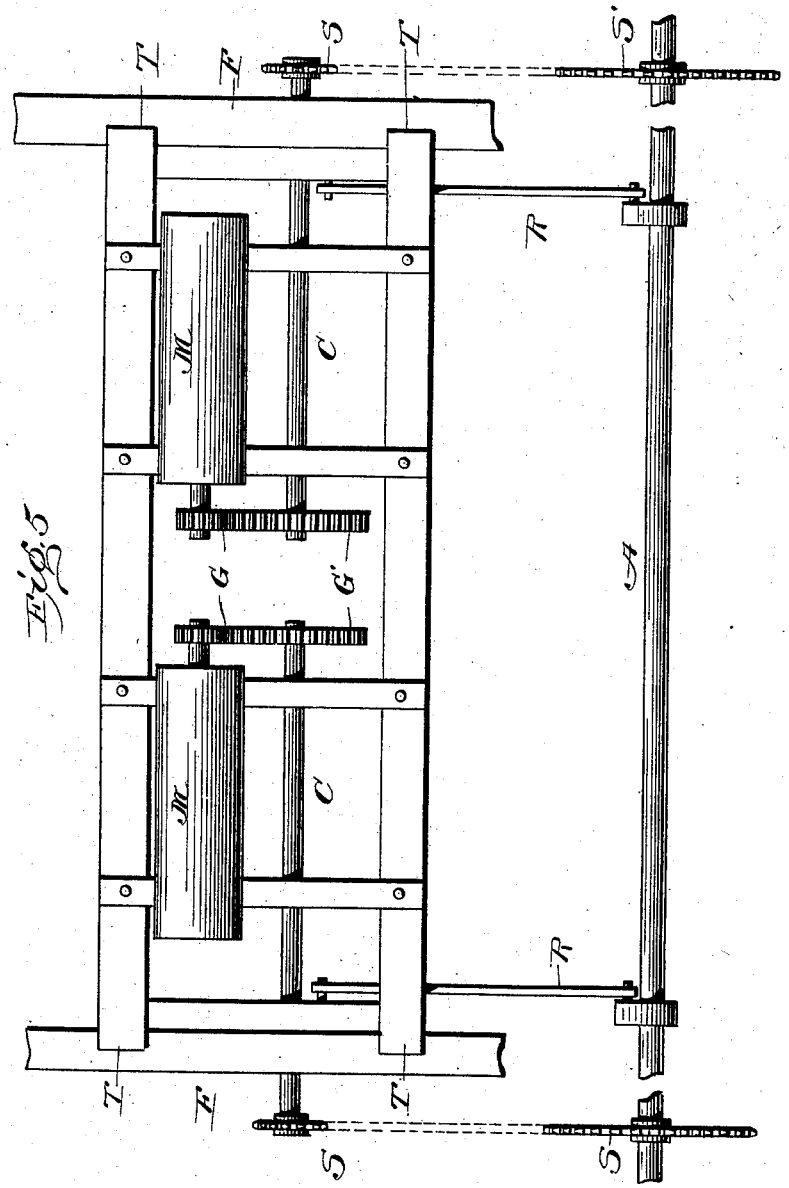

UNITED STATES PATENT OFFICE.

HENRY KEY MILNER AND JOHN McMURRAY LANSDEN, JR., OF BIRMINGHAM, ALABAMA.

TRANSMISSION-FRAME FOR AUTOMOBILES.

SPECIFICATION forming part of Letters Patent No. 717,430, dated December 30, 1902.

Application filed August 2, 1901. Serial No. 70,654. (No model.)

*To all whom it may concern:*

Be it known that we, HENRY KEY MILNER and JOHN McMURRAY LANSDEN, Jr., citizens of the United States of America, residing at Birmingham, in the county of Jefferson and State of Alabama, have invented certain new and useful Improvements in Transmission-Frames for Automobiles, of which the following is a specification.

Our invention relates to an improvement in transmission-frames for automobiles.

In electric vehicles heretofore the driving mechanism or motor has in almost every instance been suspended from the axle or running-gear. In that arrangement it is impossible to provide springs which will absorb the vibrations due to running over rough roads, and as a consequence the motor, with its gears and its transmission devices, wears very rapidly, requiring frequent repairs. As soon as the parts wear there is considerable noise attending its running. With the transmission-frame devised by us and hereinafter described the motor and its gears, as well as the transmission devices, are all mounted on a frame loosely attached to the body of the vehicle, receiving the benefit of all the springs on the vehicle, as well as the elasticity of the tires. In consequence of this arrangement the motor is relieved of the constant jarring and vibration to which it would be subjected if suspended from the running-gear or rear axle, and as a result it lasts longer and gives better satisfaction. The foregoing provision therefore is a primary object of our present invention.

A further object of our present invention is to provide for the play which takes place between the body and axle, keeping the transmission-chains, or whatever may be used, at the proper tension and the driving-sprocket at a uniform distance from the driven sprocket throughout all motions of the body-frame and axle relative to each other.

The foregoing results are brought about by the use of one or more so-called "distance-rods" between the axle and driving sprocket-shaft. These rods are hinged at each end, thus allowing the motor-frame, with the driving-shaft, to slide back and forth on the body-frame or rails.

With the foregoing objects in view our invention consists in a transmission-frame constructed and adapted to support and carry a suitable driving or actuating motor and having sliding connections with the body of the vehicle to be impelled, in connection with distance-rods hinged to the transmission-frame and a part of the running-gear, whereby to always maintain the transmission-frame at a constant distance from the rear axle of the vehicle.

Our invention further consists in certain novel features of construction and combinations of parts, which will be hereinafter described, and pointed out in the claims.

In the accompanying drawings, Figure 1 is a plan view of our improved mechanism. Fig. 2 is a front view of the same, showing transverse sections of the carriage-body sills. Fig. 3 is a side view. Fig. 4 is a view of a modified construction in which a single motor is shown with rear-axle differential, and Fig. 5 is a slightly-modified construction showing a double motor equipment with counter-shaft reduction.

The preferred construction is that shown in Figs. 1, 2, and 3, and this form will first be described.

M represents the motor, of any preferred construction, and G is a gear or pinion on one end of the motor-shaft. D indicates a differential gear of any well-known and approved construction, which meshes with the small pinion G. This differential gear is located on counter-shaft C, and the counter-shaft is revolubly supported by journal-bearings 1, 2, 3, and 4 on the lower side of the transmission-frame, as shown in Fig. 2. The transmission-frame comprises a pair of parallel bars U U, made of wood or metal, and straps V V, also of wood or metal, which extend across and connect them at their ends, as shown in Figs. 2 and 3, these parts being securely riveted together. There are four straps 5, 6, 7, and 8 extending across near the center of the frame, and two of them—namely, straps 7 and 8—constitute a saddle for the motor to rest in, they being bent into U shape for this purpose, as shown in Fig. 3. The frame thus constructed is supported on the sills F F of the carriage-body by means of angle-iron clips T T. These clips are so constructed that they do not bind the transmission-frame to the body of the vehicle, but admit of sufficient play to permit the transmission-frame to slide freely back and forth, as occasion requires. Distance-rods R R are hinged at one end to the transmission-frame at some convenient point, as at r, and at the other end to the drive-axle A, as at a, their office being to always keep the transmission-frame at a constant distance from the rear or drive axle A. Thus if the carriage-body springs downward the distance-rods R R force the frame forward on the sills F. This keeps the sprocket-chains S' S', which extend to sprocket-wheels S'' S'', on the rear wheel and which are driven by the sprocket-wheels S S on counter-shaft C always under constant or uniform tension. If the carriage-body springs higher than its normal position, the distance-rods R R draw the transmission-frame backward on the sills F F. In this way it is possible to carry the motor with its connected mechanism, as well as the battery on the carriage-body, thus deriving or taking advantage of the cushioning effect not only of the tires of the vehicle, as heretofore, but also of the springs which connect the body to the running-gear, thereby relieving the motor and connected mechanism of the jars and shocks and twisting strains hitherto sustained by these parts when supported directly upon the running-gear, and in so doing provision is made by our present invention to prevent lost motion by maintaining at all times uniform relationship in positions between the transmission-frame and the axle to be driven.

While we have described an arrangement in which the drive-axle itself is stationary and upon which the rear wheels turn, it is evident that this arrangement might be reversed and the axle itself be made to turn, in which event sprocket-wheels S'' S'' would of course be keyed direct to the axle and the rear wheels also secured to the axle to revolve with it. This is such an obvious expedient that illustration of it seems unnecessary.

In the modification shown in Fig. 4 a single motor is illustrated with a single center drive to the rear axle. In this arrangement the frame is constructed exactly as before, with the exception that the counter-shaft is unbroken and the distance-rods R R are nearer the center and the differential gear D, or "equalizing-gear," as it is sometimes called, is in this instance placed on the rear axle. G G' represent the gears on the motor-shaft and counter-shaft, respectively, which intermesh with each other. S is a sprocket-wheel on the counter-shaft, from which drive-chain S' runs to differential driving-sprocket D on the rear axle. The distance-rods R R perform the same function in this arrangement as in the previous construction.

In the modification shown in Fig. 5 a double motor equipment is employed with a double drive. In this case the frame is of exactly the same general construction as in the two previous forms; but there are two motors M M independent of one another, one of which drives one rear wheel and the other the remaining rear wheel. There are two short counter-shafts, one motor being geared to each. In this arrangement no differential or equalizing gear is necessary.

It is evident that other slight changes might be resorted to in the form and arrangement of the several parts described without departing from the spirit and scope of our invention, and hence we do not wish to limit ourselves to the exact constructions herein set forth; but, Having thus fully set forth and described our invention, what we claim as new, and desire to secure by Letters Patent, is—

1. The combination with the body portion of a motor-vehicle provided with side sills, and an axle, of a transmission frame or carriage by which a free and constant sliding connection is effected between the frame and the side sills of the vehicle-body, a motor located on said transmission frame or carriage, a gear on the shaft of the motor, a counter-shaft, a differential gear thereon intermeshed with the gear on the motor-shaft, sprocket-wheels on the counter-shaft, wheels in which the axle is supported and sprocket-chains extending from the sprocket-wheels on the counter-shaft to sprocket-wheels on the hubs of the vehicle-wheels.

2. A motor-vehicle comprising a body portion, a freely-sliding frame or carriage mounted on the body portion, a motor located on said frame or carriage, a counter-shaft supported in bearings in the sliding frame, means connecting the motor and counter-shaft whereby the latter is rotated, an axle secured to the body portion of the vehicle, means connecting the axle and the sliding frame to retain the two a predetermined distance apart, the means being pivotally attached at its ends to the frame and axle, respectively, and means for transmitting the rotary motion of the counter-shaft to the vehicle-wheels carried on the axle.

3. The combination with the sills of the motor-vehicle, of a freely-sliding transmission frame or carriage carried upon the sills, the frame extending beneath the sills, angle-clips secured to the frame and bearing upon the upper surface of the sills to permit the frame to have lateral but not vertical movement relative to the sills, straps connecting the sides of the transmission-frame, a motor located on said transmission frame or carriage, a counter-shaft supported in bearings in the frame, means connecting the motor and the counter-shaft to rotate the latter, an axle secured rigidly with respect to the sills, distance-rods extending between the axle and the frame to retain the two a predetermined distance apart, the distance-rods pivotally attached at each end to the axle and the frame, respectively, and means to transmit the rotary motion of the counter-shaft to the wheels carried on the axle.

4. The combination with the body portion of a motor vehicle and axle, of a transmission-frame consisting of a pair of bars, cross-straps rigidly secured thereto and clips by which a free and constant sliding connection is effected between the frame and the side sills of the vehicle-body, certain of said straps bent to form a U-shaped saddle, a motor located in the saddle, a gear on the shaft of the motor, a counter-shaft, a differential gear thereon intermeshed with the gear on the motor-shaft, sprocket-wheels on the counter-shaft, wheels in which the axle is supported and sprocket-chains extending from the sprocket-wheels on the counter-shaft to sprocket-wheels on the hubs of the vehicle-wheels.

5. A motor-vehicle comprising a body portion, a freely-sliding frame mounted upon the body portion, the frame provided with cross-bars, certain of the cross-bars forming a saddle, a motor received therein, a counter-shaft supported in bearings in the sliding frame, means connecting the motor and counter-shaft whereby the latter is rotated, an axle secured to the body portion of the vehicle, means connecting the axle and the sliding frame to retain the two a predetermined distance apart, the means being pivotally attached at its ends to the frame and axle, respectively, and means for transmitting the rotary motion of the counter-shaft to the vehicle-wheels carried on the axle.

6. The combination with the sills of a motor-vehicle, of a freely-sliding transmission-frame carried upon the sills, the frame extending beneath the sills, angle-clips secured to the frame and bearing upon the upper surface of the sills, to permit the frame to have lateral but not vertical movement relative to the sills, straps connecting the sides of the transmission-frame, certain of the straps forming a saddle, a motor received in the saddle, a counter-shaft supported in bearings in the frame, means connecting the motor and the counter-shaft to rotate the latter, an axle secured rigidly with respect to the sills, distance-rods extending between the axle and the frame to retain the two a predetermined distance apart, the distance-rods pivotally attached at each end to the axle and the frame, respectively, and means to transmit the rotary motion of the counter-shaft to the wheels carried on the axle.

In testimony whereof we have hereunto signed our names in the presence of two subscribing witnesses.

HENRY KEY MILNER.
JOHN McMURRAY LANSDEN, JR.

Witnesses:
C. H. COLVIN,
W. P. GOULD.